United States Patent [19]
Rigaux et al.

[11] Patent Number: 5,438,260
[45] Date of Patent: Aug. 1, 1995

[54] REMOVABLE DEVICE FOR SENSING THE ROTATION SPEED OF A BEARING, AND A VEHICLE WHEEL HUB ASSEMBLY EQUIPPED WITH SAME

[75] Inventors: Christian Rigaux, Artannes sur Indre; Christophe Houdayer; Christophe Bonnin, both of Tours; Claude Caillault, Saint Roch, all of France

[73] Assignee: SKF France, Clamart Cedex, France

[21] Appl. No.: 83,761

[22] Filed: Jun. 30, 1993

[30] Foreign Application Priority Data

Jul. 3, 1992 [FR] France .................. 92 08274

[51] Int. Cl.⁶ .................. G01P 3/48; G01P 3/54
[52] U.S. Cl. .................. 324/166; 324/173; 324/207.22; 324/207.25; 348/448
[58] Field of Search .................. 324/173, 174, 207.25, 324/160, 166, 207.22; 384/448

[56] References Cited

U.S. PATENT DOCUMENTS 5,011,303  4/1991  Caron .................. 384/448

FOREIGN PATENT DOCUMENTS 376771   9/1990   European Pat. Off. .
2659450  9/1991   France .
275861   10/1992  France .

Primary Examiner—Walter E. Snow
Attorney, Agent, or Firm—Beveridge, DeGrandi, Weilacher & Young

[57] ABSTRACT

A device for sensing the rotation speed of a bearing comprises an encoder member fastened to a rotating part of the bearing and a sensor assembly comprising a plastics material sensor support housing a sensor and a metal support for locating and fastening the sensor assembly on and to a non-rotating part of the bearing. The sensor support is overmolded onto the latter's outside surface. The sensor faces the encoder member in order to measure its rotation speed. The metal support comprises a substantially axial centring portion adapted to cooperate removably with a bearing surface on the non-rotating part of the bearing and a washer-like plane radial portion adjacent the centring portion adapted to be clamped between a radial surface of the non-rotating part of the bearing and a radial surface of a non-rotating member. The device may be fitted to vehicle wheel hub assemblies.

12 Claims, 6 Drawing Sheets

REMOVABLE DEVICE FOR SENSING THE ROTATION SPEED OF A BEARING, AND A VEHICLE WHEEL HUB ASSEMBLY EQUIPPED WITH SAME

BACKGROUND OF THE INVENTION

1. Field of the invention

The present invention concerns a device for sensing the rotation speed of a bearing and a vehicle wheel hub assembly equipped with a device of this kind for measuring the rotation speed of the wheel.

2. Description of the Prior Art

It is known to equip vehicle wheel hub assemblies with rotation speed sensing devices which usually include an encoder member fastened to a rotating part of the hub assembly and a sensor fastened to a fixed part of the hub assembly and facing the encoder member with a particular airgap between them. The sensor senses the rotation speed of the encoder member to derive the rotation speed of the rotating part carrying the encoder member. In most devices currently used the sensor is often fastened to a fixed part of the bearing in a manner that is virtually irreversible, which can cause technical problems if it is necessary to change the sensor.

To overcome this problem French patent 2 659 450 (SKF) proposes a hub assembly device fitted with a removable sensor for a non-driven vehicle wheel hub assembly. These devices have the drawback that they can be used only with a specially designed stub axle which has a passage for centring the sensor support and through which the sensor support connection passes. The need for a specially designed stub axle may increase the cost of manufacture which is undesirable in the manufacture of automobiles.

An object of the present invention is to overcome this problem by proposing a device for sensing the rotation speed of a bearing with a demountable sensor assembly that is of simple shape, economic, of compact size in the axial direction and easy to mount on the bearing and to demount from said bearing if necessary.

Another object of the invention is a vehicle wheel hub assembly equipped with a device of this kind having a compact demountable sensor.

An important advantage of the invention is that it enables the use of a common basic bearing and surrounding parts structure in applications with and without a speed sensor which is particularly beneficial in connection with standardization of production by the bearing manufacturer and by the automobile manufacturer.

SUMMARY OF THE INVENTION

The present invention consists in a device for sensing the rotation speed of a bearing comprising an encoder member fastened to a rotating part of said bearing and a sensor assembly comprising a plastics material sensor support housing a sensor and a metal support for locating and fastening said sensor assembly on and to a non-rotating part of said bearing and to the outside periphery of which said sensor support is overmolded, said sensor facing said encoder member in order to measure the rotation speed of said encoder member, said metal support comprising a substantially axial centring portion adapted to cooperate removably with a bearing surface specially provided on said non-rotating part of said bearing and a washer-like plane radial portion adjacent said centring portion adapted to be clamped between a radial surface of said non-rotating part of said bearing and a radial surface of a non-rotating member.

The centring portion of the metal support is preferably mounted on the non-rotating part of the bearing by means of an axial force or interference fit or axial snap-fastener action. The centring portion may have various configurations, for example:

a simple cylindrical bearing surface adapted to be nested in the axial direction by a sliding force or interference fit up to or into a counterpart bearing surface of the non-rotating bearing race, a cylindrical bearing surface provided with tangs which bear on or in a counterpart bearing surface of the non-rotating bearing race, axial tangs forming hooks which cooperate with an annular groove on the non-rotating bearing race, a cylindrical bearing surface with undulations which nests in the axial direction in an axial annular groove at one of the non-rotating bearing race.

By virtue of the invention the sensor assembly of the device is easy to fit to the bearing or to remove from it by simple axial nesting or axial snap-fastener action so that a bearing provided with this device ready for delivery to automobile manufacturers for mounting on a vehicle wheel stub axle can be manufactured economically.

Further, the sensor assembly of the device of the invention is independent of the sealing system for the bearing and a bearing assembly using the sensor assembly differs from one not using it in terms of the overall axial size of the bearing only by the thickness of the metal support plate corresponding to the radial part of said support.

In another aspect the invention consists in a vehicle wheel hub assembly comprising a bearing disposed between said wheel and a stub axle and equipped with a device in accordance with the invention as hereinabove defined.

To locate the sensor on the stub axle in the required angular position the bearing equipped with the device is mounted axially with the sensor positioned angularly and a lock nut is tightened to immobilize the assembly onto the stub axle in order to locate accurately and immobilize relatively to each other the non-rotating bearing race, the sensor assembly and the stub axle.

The invention will be better understood from the following detailed description given by way of non-limiting example only of various embodiments of the invention shown in the appended drawings.

DETAILED DESCRIPTION OF THE INVENTION

Figure 1:
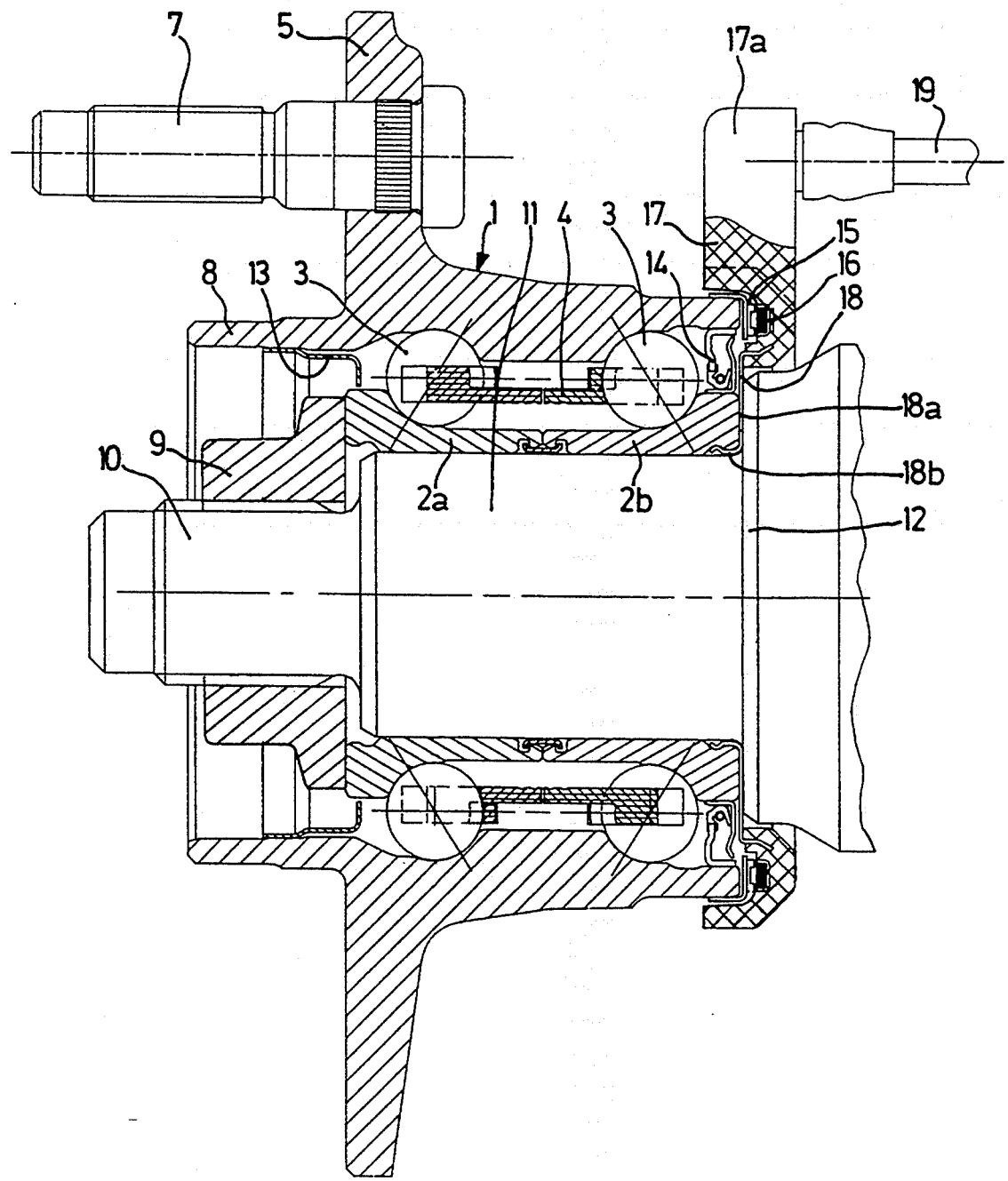
FIG. 1 is a view in axial cross-section of a hub assembly in accordance with the invention.

Referring to FIG. 1, the hub assembly selected as an example is of the type for a non-driven wheel. The hub assembly comprises a rotating outer race 1, two non-rotating inner races 2a, 2b which are side-by-side in the axial direction and two rows of rolling members 3 between rollways of the rotating outer race 1 and non-rotating inner races 2a, 2b. The rolling members 3 are retained in an annular cage 4.

The outer race 1 of the hub assembly has an annular mounting flange 5 with a plurality of equi-angularly distributed holes (see FIG. 2) for studs 7 for mounting a vehicle wheel (not shown). The exterior axial side of the outer race 1 of the hub assembly has a tubular bearing surface 8 which centers the brake disk and the vehicle wheel and covers a lock nut 9 screwed onto the free end of a stub axle 11 on which the inner rings 2a, 2b of the hub assembly are mounted. The stub axle 11 has a radial shoulder 12 which with the lock nut 9 delimits an axial space for immobilizing the inner races 2a, 2b of the hub assembly. The hub assembly is sealed by conventional sealing means 13, 14.

An encoder member 15 is fastened to one side of the rotating outer race 1 of the hub assembly and rotates with the latter to generate a varying magnetic field in a sensor 16 facing the encoder member with a small airgap between them. The operation of the encoder member 15 and the sensor 16 is known in itself and will not be described in detail here.

The sensor 16 is embedded in a plastics material annular sensor support 17 which is overmolded onto the outer peripheral part of an annular metal support 18. The metal support is fastened to the non-rotating race 2b. The sensor assembly comprising the sensor 16, the sensor support 17 and the metal support 18 is fixed, the encoder member 15 being rotated by the rotating outer race 1 of the hub assembly. The sensor support 17 has a connecting lead 17a connected to a connecting cable 19 which connects the sensor 16 to a signal processor unit (not shown).

Figure 2:
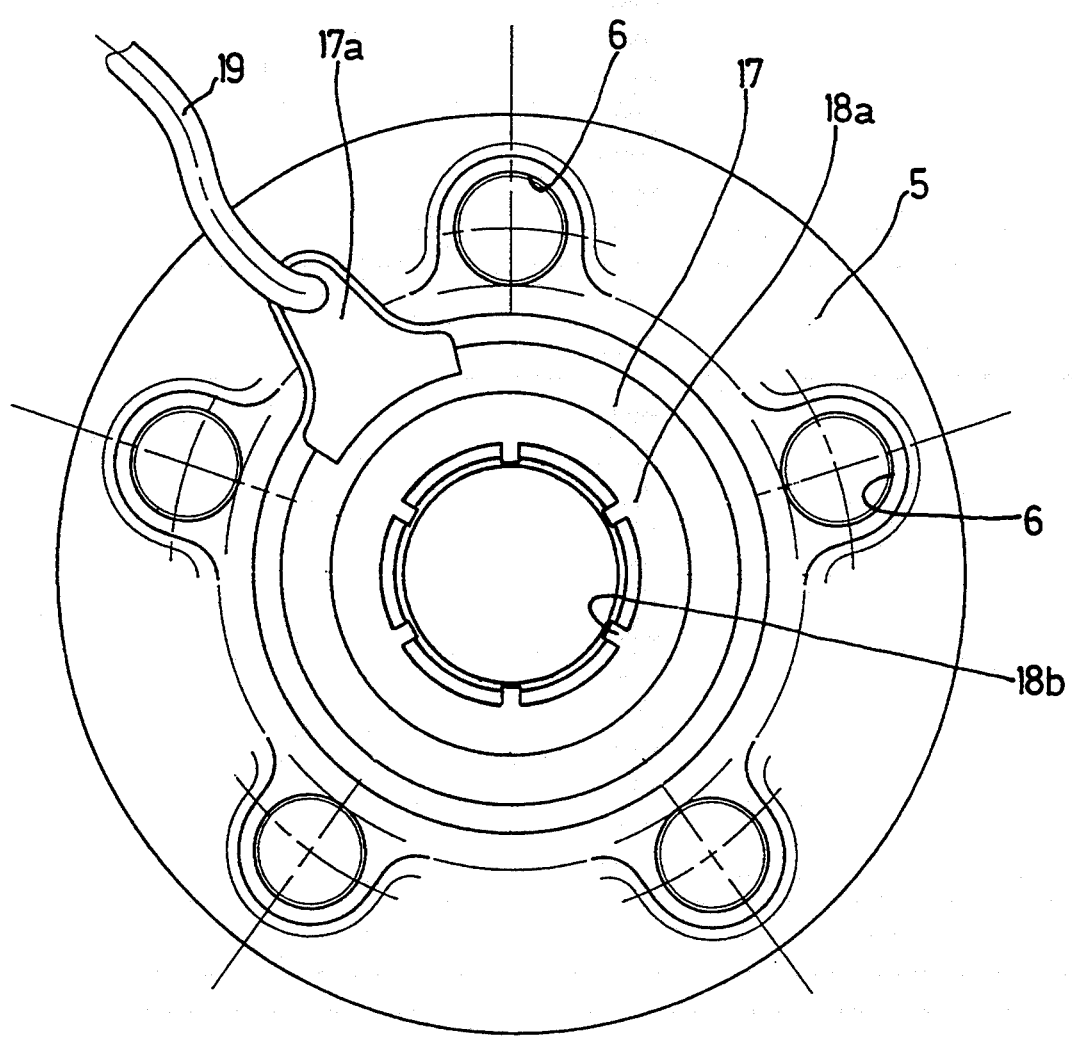
FIG. 2 is an exterior axial view of the hub assembly from FIG. 1 with the stub axle omitted.
Figure 3:
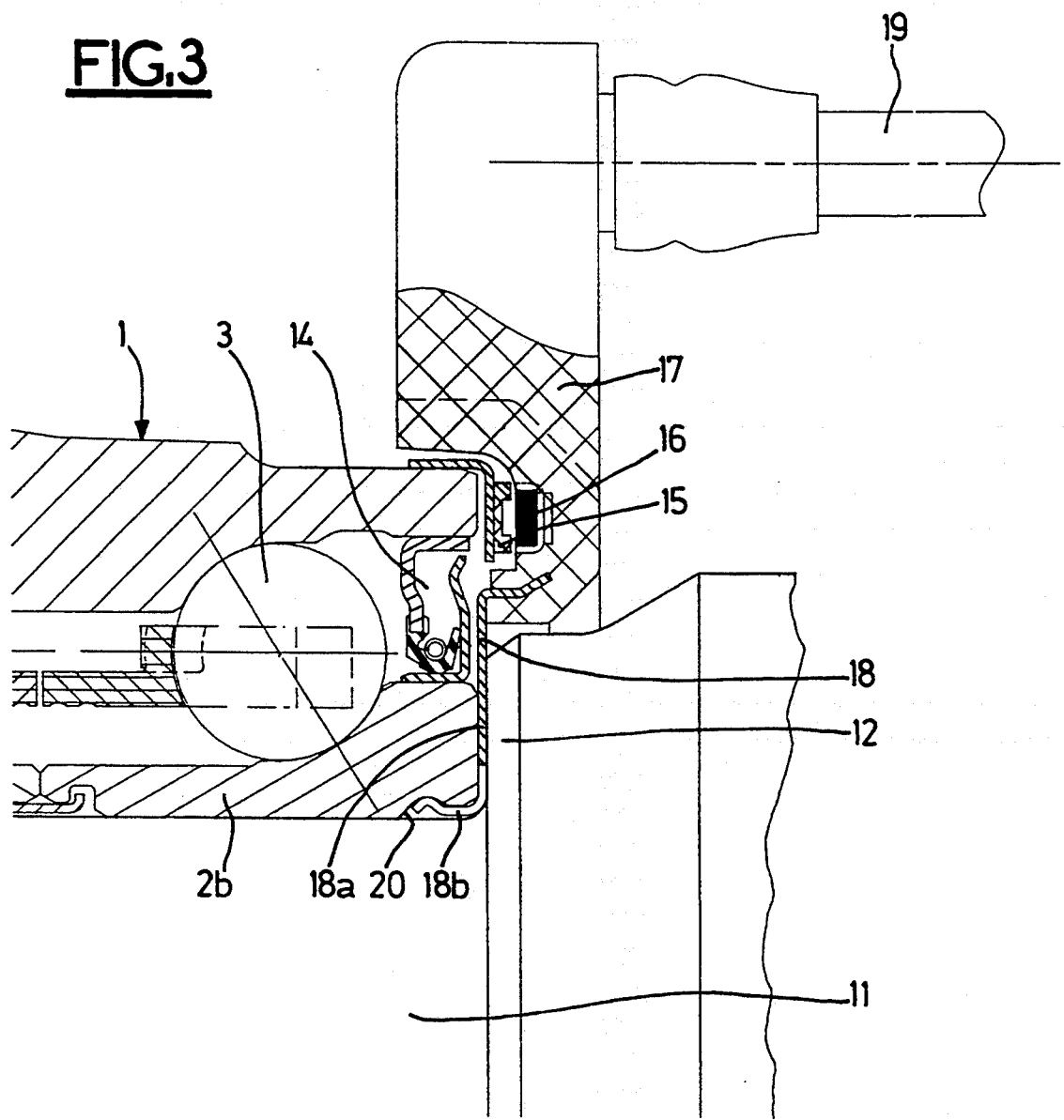
FIG. 3 is a view in axial cross-section of part of the hub assembly from FIG. 1 in a first embodiment of the invention.

Referring to FIGS. 1 through 3, the metal support 18 has a washer-like plane radial portion 18a which is axially located between one side of the inner race 2b of the hub assembly and the shoulder 12 of the stub axle. Clamping the radial portion 18a of the metal support 18 locates the sensor assembly 16, 17 and 18 of the sensing device in accordance with the invention in the angular direction and immobilizes it. To center the sensor assembly radially the metal support 18 has a centring portion 18b in the form of axial tangs forming hooks (FIG. 3) which cooperate with an annular groove 20 in the non-rotating race 2b of the hub assembly. The centring portion 18b is mounted on the non-rotating race 2b by axial snap-fastener engagement of the tangs in the groove 20.

Referring again to FIG. 1, to change the sensor assembly 17, 18 all that is required is to remove the lock nut 9 and then to remove the hub assembly from the stub axle 11. Then an axial force is applied to the sensor assembly to disengage the centring portion 18b from the annular groove in the non-rotating inner race 2b of the hub assembly. A replacement sensor assembly is then fitted by reversing the above operations.

Figure 4:
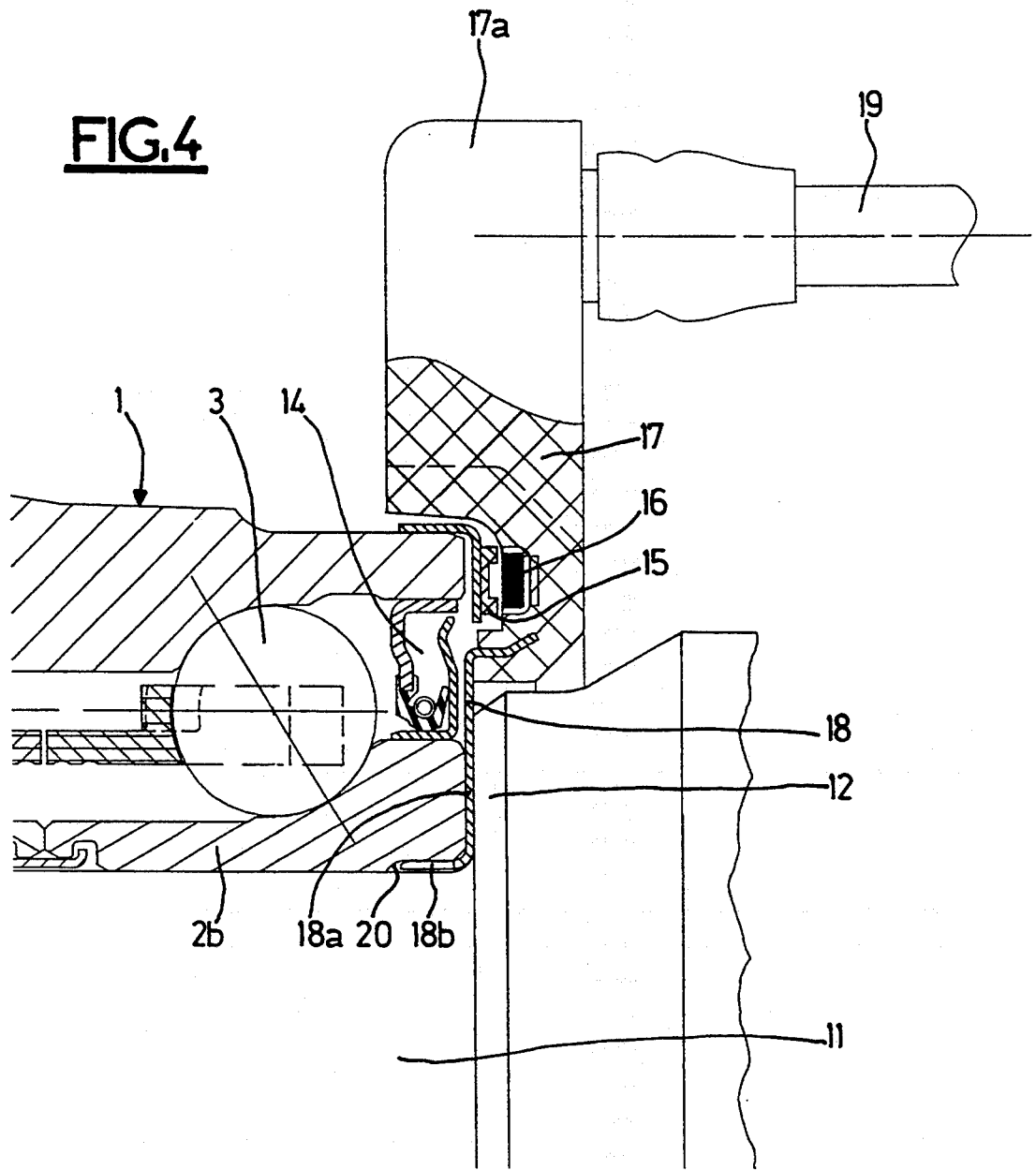
FIG. 4 is a view in axial cross-section of part of the hub assembly from FIG. 1 in a second embodiment of the invention.

The embodiment shown in FIG. 4 differs from that shown in FIG. 3 only in the shape of the centring portion 18b of the metal support 18. Here the centring portion 18b is in the form of axial tangs distributed over a cylindrical surface and an axial force or interference fit in a cylindrical recess 20 in the non-rotating race 2b of the hub assembly.

Figure 5:
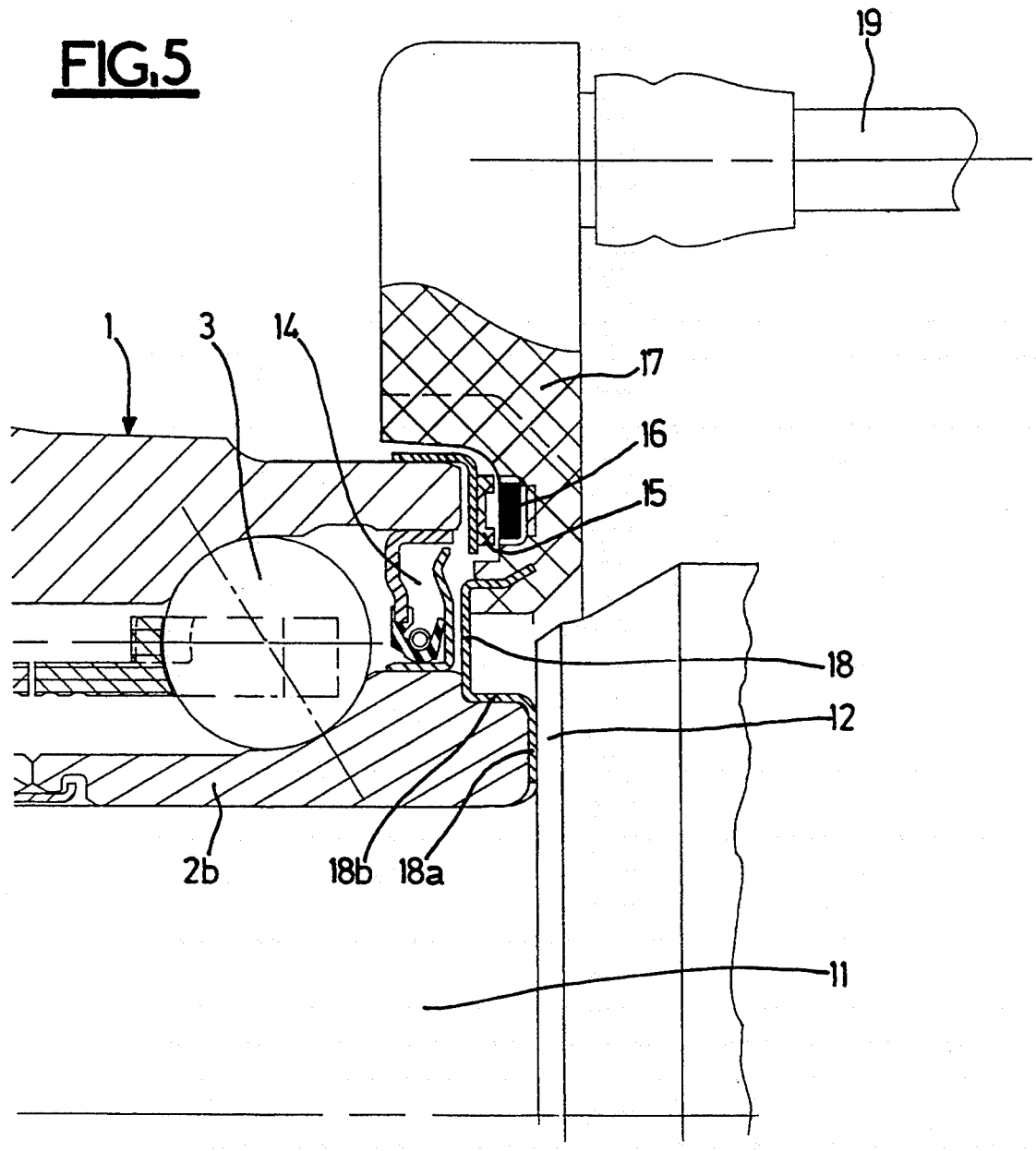
FIG. 5 is a view in axial cross-section of part of the hub assembly from FIG. 1 in a third embodiment of the invention.

In the embodiment shown in FIG. 5 the centring portion 18b of the metal support 18 is in the form of a simple cylindrical bearing surface which is an external force or interference fit on a corresponding bearing surface of the non-rotating inner race 2b.

Figure 6:
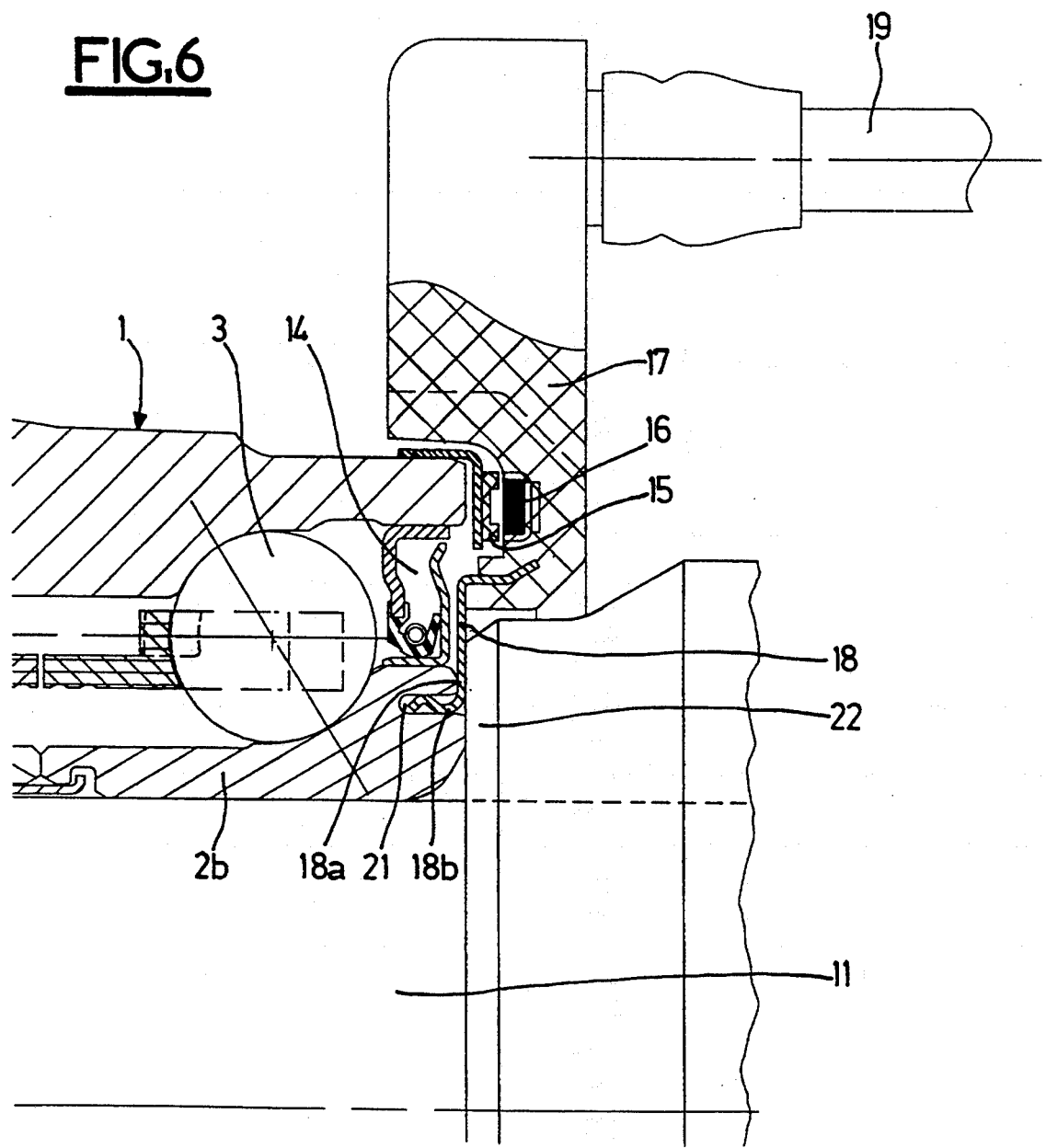
FIG. 6 is a view in axial cross-section of part of the hub assembly from FIG. 1 in a fourth embodiment of the invention.

FIG. 6 shows another embodiment in which the centring portion 18b of the metal support 18 is in the form of a cylindrical bearing surface with undulations which nests axially in an axial annular groove 21 in the non-rotating inner race 2b of the hub assembly opening onto the side surface of the non-rotating race. In this embodiment the stub axle 11 is fastened to a stub axle-holder 22 which has the same function as the shoulder 12 of the stub axle, namely to retain the radial portion 18a of the metal support 18.

The examples described above show clearly that it is not necessary to modify the basic structure of the stub axle to fit the hub assembly with the device of the invention, the only requirement being to provide a corresponding bearing surface on the non-rotating race 2b to receive the centring portion 18b of the metal support of the sensor assembly. The device of the invention does not significantly increase the overall axial size of the hub assembly since it introduces only the negligible thickness of the plate of the radial portion 18a of the metal support 18. Accordingly, one particularly advantageous aspect of the invention is that it enables the manufacture of a vehicle wheel hub assembly equipped with a rotation speed sensing device as previously described.

Without departing from the scope of the invention the device could be used to determine the rotation speed of a bearing in an application other than a vehicle wheel bearing.

There is claimed:

1. A device for sensing the rotation speed between a rotating part and a non-rotating part of a bearing, said non-rotating part having a radial surface, said device comprising an encoder element fastened to said rotating part and a sensor assembly fastened to said non-rotating part, said sensor assembly comprising a sensor facing said encoder element for measuring the rotation speed of said encoder element, a plastics material sensor support housing said sensor, and an annular metal support which includes:
   - an outer peripheral portion overmolded by said plastics material sensor support,
   - a substantially axial centering portion adapted to cooperate removably with a bearing surface specially provided on said non-rotating part, and
   - a washer-like plane radial portion adjacent said centering portion and bearing against said radial surface of said non-rotating part, said radial portion adapted to be clamped between said radial surface of said non-rotating part and a radial surface of a non-rotating member to which said non-rotating part is fastened.

2. A device for sensing the rotation speed between a rotating part and a non-rotating part of a bearing, said non-rotating part having a radial surface, a non-rotating member to which said non-rotating part is fastened, said non-rotating member having a radial surface, said device comprising an encoder element fastened to said rotating part and a sensor assembly fastened to said non-rotating part, said sensor assembly comprising a sensor facing said encoder element for measuring the rotation speed of said encoder element, a plastics material sensor support housing said sensor, and an annular metal support which includes:

an outer peripheral portion overmolded by said plastics material sensor support, a substantially axial centering portion adapted to cooperate removably with a bearing surface specially provided on said non-rotating part, and a washer-like plane radial portion adjacent said centering portion and bearing against said radial surface of said non-rotating part, said radial portion being clamped between said radial surface of said non-rotating part and said radial surface of said non-rotating member to which said non-rotating part is fastened.

3. Device according to claim 1 wherein said centring portion is mounted on said non-rotating part of said bearing by means of an axial force or interference fit or axial snap-fastener action.

4. Device according to claim 1 wherein said device comprises a cylindrical bearing surface which slides axially into a force or interference fit nesting interengagement on or in a corresponding bearing surface of said non-rotating part of said bearing.

5. Device according to claim 1 wherein said centring portion comprises a cylindrical bearing surface having tangs which nest axially on or in the corresponding bearing surface of said non-rotating part of said bearing.

6. Device according to claim 1 wherein said centring portion comprises axial tangs adapted to cooperate with an annular groove on said non-rotating part of said bearing.

7. Device according to claim 1 wherein said centring portion comprises a cylindrical bearing surface having undulations and adapted to nest axially in an axial groove in one side surface of said non-rotating part of said bearing.

8. Vehicle wheel hub assembly comprising a bearing disposed between the wheel and a stub axle and equipped with a measuring device according to claim 1 wherein said metal support has a radial portion which is clamped between a side surface of said non-rotating race of said bearing and a shoulder of said stub axle or a radial surface of a stub axle-holder.

9. Device according to claim 3 wherein said device comprises a cylindrical bearing surface which slides axially into a force or interference fit nesting interengagement on or in a corresponding bearing surface of said non-rotating part of said bearing.

10. Device according to claim 3 wherein said centring portion comprises a cylindrical bearing surface having tangs which nest axially on or in the corresponding bearing surface of said non-rotating part of said bearing.

11. Device according to claim 3 wherein said centring portion comprises axial tangs adapted to cooperate with an annular groove on said non-rotating part of said bearing.

12. Device according to claim 3 wherein said centring portion comprises a cylindrical bearing surface having undulations and adapted to nest axially in an axial groove in one side surface of said non-rotating part of said bearing.

* * * * *